United States Patent [19]
Wilcox

[11] 4,275,419
[45] Jun. 23, 1981

[54] VIDEO AMPLIFIER WITH NOISE INVERSION

[75] Inventor: Milton E. Wilcox, San Jose, Calif.

[73] Assignee: National Semiconductor Corporation, Santa Clara, Calif.

[21] Appl. No.: 125,605

[22] Filed: Feb. 28, 1980

[51] Int. Cl.³ .............................................. H04N 5/44
[52] U.S. Cl. .................................... 358/167; 358/184
[58] Field of Search ............... 358/155, 156, 157, 167, 358/184

[56] References Cited
U.S. PATENT DOCUMENTS
3,624,288  11/1971  Hofmann ............................ 358/157

Primary Examiner—Robert L. Richardson
Attorney, Agent, or Firm—Gail W. Woodward; James A. Sheridan

[57] ABSTRACT

A video amplifier, for use with a synchronous detector, employs a first differential amplifier stage, coupled through a level-shifting circuit to the synchronous detector output. A noise-responsive second differential amplifier stage has its output cross connected with the first differential amplifier and is biased to be normally unresponsive. In the event of an inverted noise impulse at the detector output, the second differential amplifier is turned on and its cross-connected output cancels the output of the first differential amplifier, thus canceling the noise impulse. If the noise is strong enough, the output will go into the black video region. This avoids the excess white video noise which results in very undesirable spot blooming.

5 Claims, 3 Drawing Figures

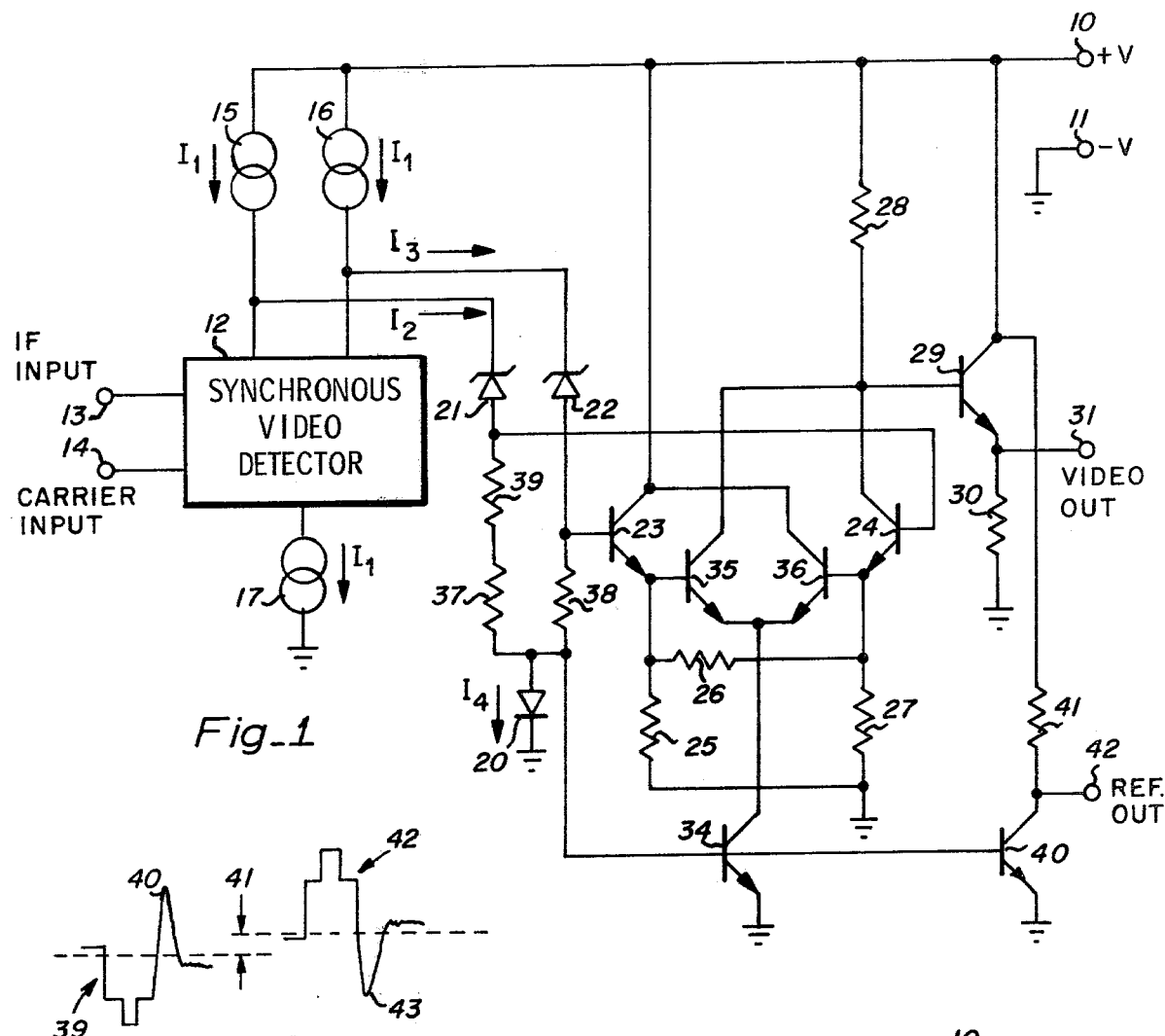
Fig_1
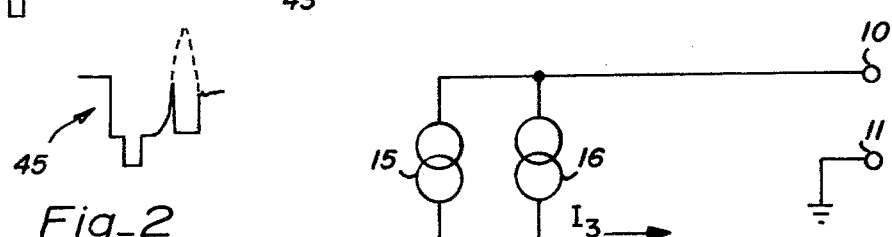
Fig_2
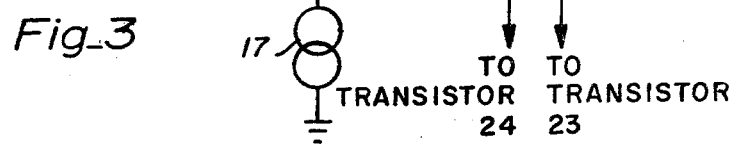
Fig_3

VIDEO AMPLIFIER WITH NOISE INVERSION

BACKGROUND OF THE INVENTION

In synchronous AM detectors, the detected output is a function of the phase as well as the amplitude of the modulated carrier. Noncorrelated interfering signals, such as impulse noise, can be of anti-phase with respect to the reference, which causes an output polarity opposite to that of the desired envelope. In television, the normal detection polarity is negative; that is, the largest carrier level produces the most negative output (corresponding to black on the screen). Impulse noise undesirably causes large positive output spikes, which result in brilliant white spots on the screen. Therefore, additional circuitry, commonly called a white-spot inverter, must be added to invert these spots to less visible black. The inverter must be fast, but must not interfere with normal detection.

A further problem with monolithic synchronous detectors is that they necessarily must use NPN multipliers to operate at TV and radio intermediate frequencies. The output of such detectors is a current flowing out of the multiplier, which must be level-shifted and amplified to produce a usable output. U.S. Pat. No. 3,908,171 teaches one way in which zener diodes may be used to accomplish level-shifting, but does not address the requirement of white-spot inversion.

SUMMARY OF THE INVENTION

It is an object of the invention to provide a video amplifier circuit which includes a noise inverter and is suitable for integrated circuit (IC) construction.

It is a further object of the invention to provide a video amplifier circuit suitable for use with a synchronous detector.

It is a still further object of the invention to provide a video amplifier with noise inversion and a differential input with a single ended output having a carrier related level.

These and other objects are achieved in a circuit configured as follows. A first differential amplifier has its input coupled through a level shifter to a synchronous detector output. This first differential amplifier has a single-ended output which has a level related to the carrier applied to the detector. A second differential amplifier has its output cross coupled to the first differential amplifier output and its input is coupled to the first differential amplifier and biased thereby so as to be inoperative normally. When an inverted or white noise impulse appears at the detector output, the second differential amplifier is turned on and its output cancels that of the first differential amplifier. The second differential amplifier has its tail current provided by a current mirror that sums the synchronous detector outputs.

BRIEF DESCRIPTION OF THE DRAWING

FIG. 1 is a schematic diagram of the circuit of the invention;

FIG. 2 shows the waveforms associated with the circuit of FIG. 1; and

FIG. 3 is a schematic diagram of an alternative level-shifter.

DESCRIPTION OF THE INVENTION

In FIG. 1, the circuit is operated from a power supply connected between terminal 10 (+V) and terminal 11 (−V). The circuit is operated from a conventional multiplier which is shown as a synchronous detector 12. A video carrier, the IF input, as applied at terminal 13 and a reference carrier is applied at terminal 14. Three equal value current sources ($I_1$) are shown at 15, 16 and 17. The sources at 15 and 16 comprise the detector loads. Since the current sources are equal, the output at load 15, which is $I_2$, is equal to $I_1 + I_V$ where $I_V$ is the video current which is close to zero for white. The other output, $I_3$, is equal to $I_1 - I_V$. These currents are summed in diode 20 so that $I_4$ equals $I_1$. Zener diodes 21 and 22 shift the voltage level at the detector output thereby to directly couple to transistors 23 and 24, so as to differentially drive them with a voltage proportional to $I_V$. Resistors 25, 26 and 27 couple the emitters of transistors 23 and 24 to produce a differential connection. Resistor 28 provides the output load for the differential amplifier. Transistor 29 is connected as an emitter follower with resistor 30 as a load therefor. Thus, the video output appears at terminal 31 and is referenced to ground.

Transistors 35 and 36 are connected as a second differential amplifier with its tail current supplied by transistor 34, which mirrors $I_4$ flowing in diode 20. Thus, the current flowing in the second differential amplifier is related to $I_1$. The collectors of transistors 35 and 36 are cross connected (inverted) with respect to the collectors of transistors 23 and 24.

Resistors 37 and 38 are matched and resistor 39 provides an offset voltage to the bases of transistors 23 and 24. This offset is directly coupled to the bases of transistors 35 and 36. The offset magnitude is made such that transistor 35 is substantially off and the second differential amplifier contributes very little to the output. However, if a noise spike is present to drive the video into the white region, transistor 35 will be turned on and will dominate the current flowing in resistor 28. Without this action, the current in transistor 24 could cease and resistor 28 would pull the base of transistor 29 close to +V and a positive noise spike would appear at terminal 31. This would result in white-spot generation in the TV display. This is avoided by the action of transistor 35.

FIG. 2 associates some waveforms with the circuit of FIG. 1. The waveform at 39 represents the signal at the base of transistor 23, while the waveform at 42 represents the waveform at the base of transistor 24. The offset voltage is illustrated at 41 as the difference in references. Noise spike 40 is associated with waveform 39 as is noise spike 43 associated with waveform 42. This form of noise is inverted from the normal video from detector 12 and would ordinarily drive the TV display into the white region. As shown in waveform 45, the action of transistor 35 inverts the noise spike and drives it into the black, which is not objectionable. The dotted line shows what would happen without noise cancellation.

Since the current flowing in the second differential amplifier is a mirrored version of the sum of the detector outputs, $I_4$, the current has the same characteristics as the detector bias currents. The same current would flow in transistor 40 and would be mirrored in resistor 41 so that the voltage at terminal 42 could be used as a related reference voltage for the AGC detector or other TV circuitry.

FIG. 3 shows an alternative level shifting circuit. The zener diodes 21 and 22 are replaced with a pair of transistors 50 and 51. Zener diode 52 sets the base voltage at a level such that the detector output level, which is one base to emitter diode above the zener level, is sufficient for linear operation of the detector. The collectors of transistors 50 and 51 can be operated at any desired potential below the zener diode voltage. The collector currents will be the transistor alpha multiplied by the detector outputs. Since alpha is close to unity, the circuit operation is very close to that of FIG. 1.

EXAMPLE

The circuit of FIG. 1 was fabricated using conventional NPN transistors and operated from a 12 volt supply between terminals 10 and 11. The following component values were employed.

| Component | Value |
| --- | --- |
| Sources 15, 16 and 17 | 2 mA |
| Zener Diodes 21 and 22 | 6.5 volts |
| Resistor 25 | 750 ohms |
| Resistor 26 | 1K ohms |
| Resistor 27 | 4.5K ohms |
| Resistor 28 | 4.5K ohms |
| Resistor 30 | 3.3K ohms |
| Resistors 37 and 38 | 1.5K ohms |
| Resistor 39 | 150 ohms |

The circuit operated as described above. The offset voltage 41 was about 150 mv and noise spikes that would ordinarily produce white dotting were cancelled. In normal operation, the video level at terminal 31 was about 3 volts peak to peak.

The invention has been described and an operating example given. There clearly are alternatives and equivalents within the spirit and intent of the invention that would occur to a person skilled in the art upon reading the foregoing. Accordingly, it is intended that the scope of the invention be limited only by the claims that follow.

I claim:

1. A video amplifier circuit comprising:
   synchronous detector means having a pair of video signal outputs, said detector means normally supplying opposite phase video signals and having the characteristic of producing impulse noise outputs of a polarity opposite to that of said video signals;
   first differential amplifier means having a pair of inputs coupled to said detector means outputs and a single-ended output which provides an amplified video signal;
   level-shifting means connected between said detector means and said first differential amplifier means inputs;
   second differential amplifier means having a pair of inputs coupled to said first differential amplifier means and cross-connected outputs coupled to said output of said first differential amplifier; and
   means within said level-shifting means for providing quiescent bias in said first differential amplifier means, whereby said second differential amplifier means is inactive except when said opposite polarity noise outputs are present.

2. The circuit of claim 1 further comprising means for summing the outputs of said detector means for biasing said second differential amplifier means.

3. The circuit of claim 2 further comprising means responsive to said means for summing for developing a reference potential.

4. The circuit of claim 1, wherein said level-shifting means comprise a pair of zener diodes coupling said detector to said first differential amplifier inputs.

5. The circuit of claim 1, wherein said level-shifting means comprise a pair of transistors having their emitters coupled to said detector, their collectors coupled to said first differential amplifier inputs and their bases coupled to a source of constant potential.

* * * * *